United States Patent
Bazzo et al.

(10) Patent No.: US 11,458,659 B2
(45) Date of Patent: Oct. 4, 2022

(54) METHOD AND APPARATUS FOR PRODUCING HOLLOW ARTICLES MADE OF INJECTION MOULDED PLASTIC MATERIAL

(71) Applicant: INGLASS S.p.A., San Polo di Piave (IT)

(72) Inventors: Maurizio Bazzo, San Polo di Piave (IT); Massimo Rossi, San Polo di Piave (IT)

(73) Assignee: INGLASS S.p.A.

( * ) Notice: Subject to any disclaimer, the term of this patent is extended or adjusted under 35 U.S.C. 154(b) by 643 days.

(21) Appl. No.: 16/133,109

(22) Filed: Sep. 17, 2018

(65) Prior Publication Data

US 2019/0084202 A1   Mar. 21, 2019

(30) Foreign Application Priority Data

Sep. 20, 2017 (IT) .................. 102017000105306

(51) Int. Cl.
  *B29C 45/80*  (2006.01)
  *B29C 45/23*  (2006.01)
  (Continued)

(52) U.S. Cl.
  CPC ...... *B29C 45/14836* (2013.01); *B29C 45/231* (2013.01); *B29C 45/768* (2013.01);
  (Continued)

(58) Field of Classification Search
  CPC . B29C 45/14836; B29C 45/80; B29C 45/231; B29C 45/768; B29C 45/77;
  (Continued)

(56) References Cited

U.S. PATENT DOCUMENTS

| | | | |
|---|---|---|---|
| 5,846,573 A | 12/1998 | Wurst et al. | |
| 5,972,256 A * | 10/1999 | Wurst | B29C 33/76 |
| | | | 264/40.1 |

(Continued)

FOREIGN PATENT DOCUMENTS

| | | |
|---|---|---|
| EP | 1867457 A2 | 12/2007 |
| JP | 2008001734 A | 1/2008 |
| JP | 2016135586 A | 7/2016 |

OTHER PUBLICATIONS

Priority Search Report dated Feb. 20, 2018 for IT 102017000105306. 7 pages.

(Continued)

*Primary Examiner* — Jacob T Minskey
*Assistant Examiner* — Caroline Beha
(74) *Attorney, Agent, or Firm* — RMCK Law Group PLC (57) ABSTRACT

A method and apparatus for producing hollow articles made of injection moulded plastic material by a mould having a die within which there is inserted a core, and at least one injector including a pin valve displaceable between a closing position and an opening position for injecting the pressurized plastic material into a space comprised between the die and the core. During the injection, any flexural deflection of the core is detected and the pin valve of the or of each injector is displaced in a controlled fashion to adjust a pressure and a flow rate of the injected plastic material, so as to reduce or eliminate such deflection of the core.

3 Claims, 7 Drawing Sheets

(51) Int. Cl.
*B29C 45/76* (2006.01)
*B29C 45/77* (2006.01)
*B29C 45/28* (2006.01)
*B29C 45/14* (2006.01)

(52) U.S. Cl.
CPC .............. *B29C 45/77* (2013.01); *B29C 45/80* (2013.01); *B29C 2045/2872* (2013.01); *B29C 2945/76006* (2013.01); *B29C 2945/7626* (2013.01); *B29C 2945/76083* (2013.01); *B29C 2945/76103* (2013.01); *B29C 2945/76254* (2013.01); *B29C 2945/76287* (2013.01); *B29C 2945/76381* (2013.01); *B29C 2945/76454* (2013.01); *B29C 2945/76498* (2013.01); *B29C 2945/76545* (2013.01); *B29C 2945/76658* (2013.01); *B29C 2945/76859* (2013.01)

(58) Field of Classification Search
CPC ........... B29C 2945/76083; B29C 2945/76287; B29C 2945/76006; B29C 2945/76498; B29C 2045/2872; B29C 2945/76254; B29C 2945/76103; B29C 2945/7626; B29C 2945/76381; B29C 2945/76454; B29C 2945/76545; B29C 2945/76658; B29C 2945/76859; B29C 45/2602; B29C 45/2806; B29C 45/76

See application file for complete search history.

(56) References Cited

U.S. PATENT DOCUMENTS

| | | | | |
|---|---|---|---|---|
| 6,287,107 | B1* | 9/2001 | Kazmer | B29C 45/1603 425/562 |
| 2004/0166189 | A1* | 8/2004 | Babin | B29C 45/30 425/144 |
| 2004/0227272 | A1* | 11/2004 | Saito | B29C 45/561 264/259 |
| 2005/0236725 | A1* | 10/2005 | Niewels | B29C 45/80 264/40.1 |
| 2008/0317898 | A1* | 12/2008 | Fairy | B29C 45/2806 425/549 |
| 2015/0202811 | A1* | 7/2015 | Tabassi | B29C 45/2735 425/588 |

OTHER PUBLICATIONS

1st Japanese Office Action dated Sep. 23, 2020 in connection with Japanese Application No. 2018-14998. 3 Pages.

\* cited by examiner

METHOD AND APPARATUS FOR PRODUCING HOLLOW ARTICLES MADE OF INJECTION MOULDED PLASTIC MATERIAL

CROSS-REFERENCE TO RELATED APPLICATION

This application claims priority to Italian Patent Application No. 102017000105306 filed Sep. 20, 2017. The disclosure of the above application is incorporated herein by reference in its entirety.

FIELD OF THE INVENTION

The present invention generally regards the injection moulding of plastic materials, and in particular it regards a method and an apparatus for the production of hollow articles made of injection moulded plastic material.

STATE OF THE ART

The injection moulding of hollow articles made of plastic material is typically carried out by means of a mould having a die defining a cavity into which a core is inserted. At least one injector including a pin valve displaceable between a closing position and an opening position injects the pressurised plastic material into the space comprised between the mould and the core. The displacement of the pin valve of the injector is carried out by a fluid or electrical actuator, in the second case for example by a rotary motor as described and illustrated in document U.S. Pat. No. 9,102,085 on behalf of the Applicant.

In the injection moulding of hollow articles, particularly of the elongated shape and with thin wall, there arises the problem related to the fact that during the step of filling the space comprised between the mould and the core, the latter can be subjected to displacements or flexural deflections a due to unavoidable unbalancing of the injected plastic material and acting in an unbalanced manner on one side and on the opposite side of the core.

The displacement or deflection of the core causes several drawbacks such as for example the possible breaking of the core, aesthetic defects of the moulded components, and above all structural defects of such components due to failure to meet the relative design nominal thicknesses requirements.

Moulding specialists currently use different sensors in the core and in the die and limit injection based on the pressure delta between juxtaposed sensors or on the maximum value achieved by a sensor. However, this has the sole purpose of avoiding damage during the injection and post-injection step, e.g. due to the fact that the component cannot be extracted, and the core deflection cannot be controlled.

Over the years, the Applicant has designed and developed a servo-driven obturation system, referred to as FLEXflow®, which guarantees a precise control of the pressure and the flow of the injected material during the moulding process. In particular, the actuator of the or of each injector is electronically controlled so as to adjust the position, the speed and the acceleration of the pin valve in a programmable manner, so as to adjust the pressure and the flow rate of the injected plastic material.

SUMMARY OF THE INVENTION

The object of the present invention is to overcome the technical problem defined above by applying and adapting the aforementioned servo-driven obturation method to the injection moulding of hollow articles, in an efficient manner and such to eliminate the aforementioned drawbacks.

With the aim of attaining such object, the invention provides for, according to a first aspect, an injection moulding method of the type defined at the beginning whose main characteristic lies in the fact that during the injection there is detected a flexural deflection of the core, and the controlled displacement of the pin valve of the or of each injector and it is carried out by adjusting at least one among the position, speed, acceleration and stroke of the pin valve up to reducing or eliminating such deflection.

With the aim of detecting the flexural deflection of the core, the invention provides for measuring any deflection of the core, or the position of the free end thereof, possibly in combination with the detection of the pressure of the injected plastic material.

In a preferred embodiment of the invention, the injection of the plastic material occurs by means of at least one pair of injectors located on opposite sides with respect to the core.

Due to this solution idea, during the step of the controlled filling of the space comprised between the die and the core, unbalancing and thus the bending of core is eliminated, thus avoiding possible breaking and thus eliminating aesthetic and structural defects of the moulded articled. In particular, the design nominal thicknesses requirements can be met precisely.

According to another aspect, the invention regards an apparatus for the implementation of the method, essentially characterised in that it comprises at least one sensor suitable to detect the flexural deflection of the core during injection and connected to the electronic control unit configured to perform the controlled displacement of the pin valve of the or of each injector by adjusting at least one among the position, speed, acceleration and stroke of the pin valve up to reducing or eliminating any deflection.

With the aim of implementing the invention, the moulding apparatus may comprise one or more injection points, or one or more injectors, whose pin valve is actuated by a pneumatic, hydraulic or electrical actuator, and in which the core deflection detection can be carried out by means of at least one deflection transducer of the base of the core and/or position transducer of the free end of the core, possibly combined with the pressure transducer of the injected plastic material. The position transducer, for example of the induction type or equivalent, can be positioned in proximity of the free end of the core or on the die or in the space comprised between the die and the core.

BRIEF DESCRIPTION OF THE DRAWINGS

The invention will now be described in detail, purely by way of non-limiting example, with reference to the attached drawings, wherein.

DETAILED DESCRIPTION OF THE INVENTION

Figure 12:
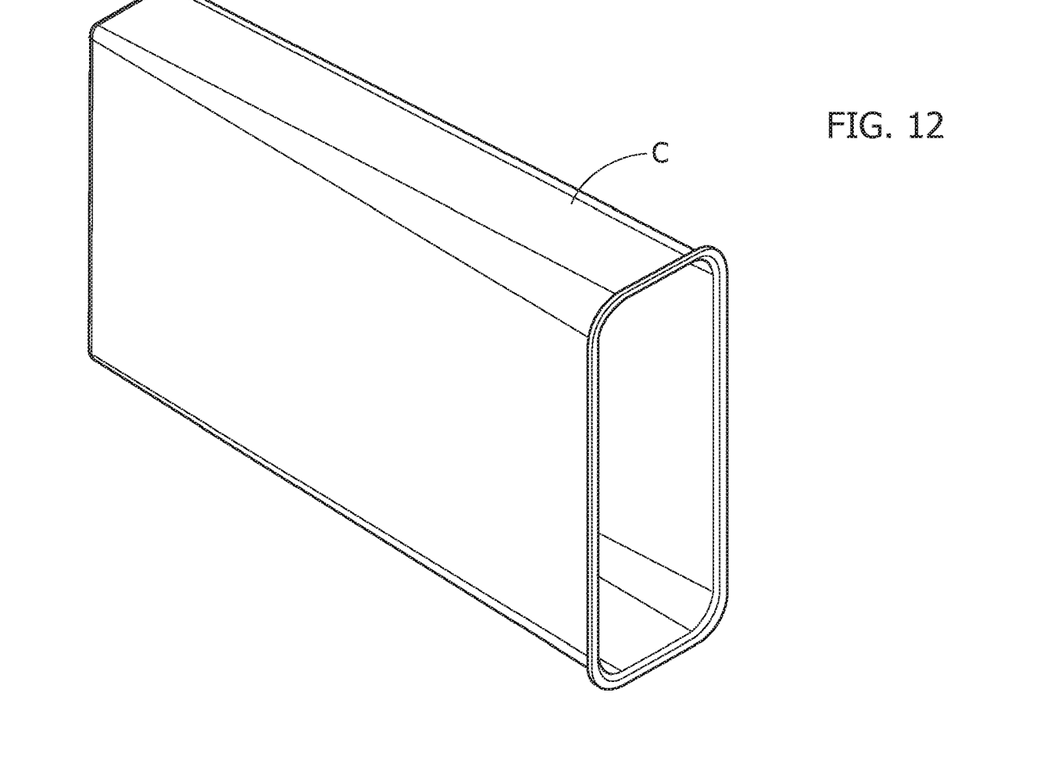
FIG. 12 is a schematic perspective view of an example of a hollow article obtained using the injection moulding method and apparatus according to the invention.

The following description refers to production by means of injection moulding of hollow articles made of plastic material such as the one schematically represented in FIG. 12 and indicated with C: it is a container with elongated shape (for example length equivalent to 350 mm) and a thin wall (nominal thickness for example equivalent to 2 mm).

Figure 1:
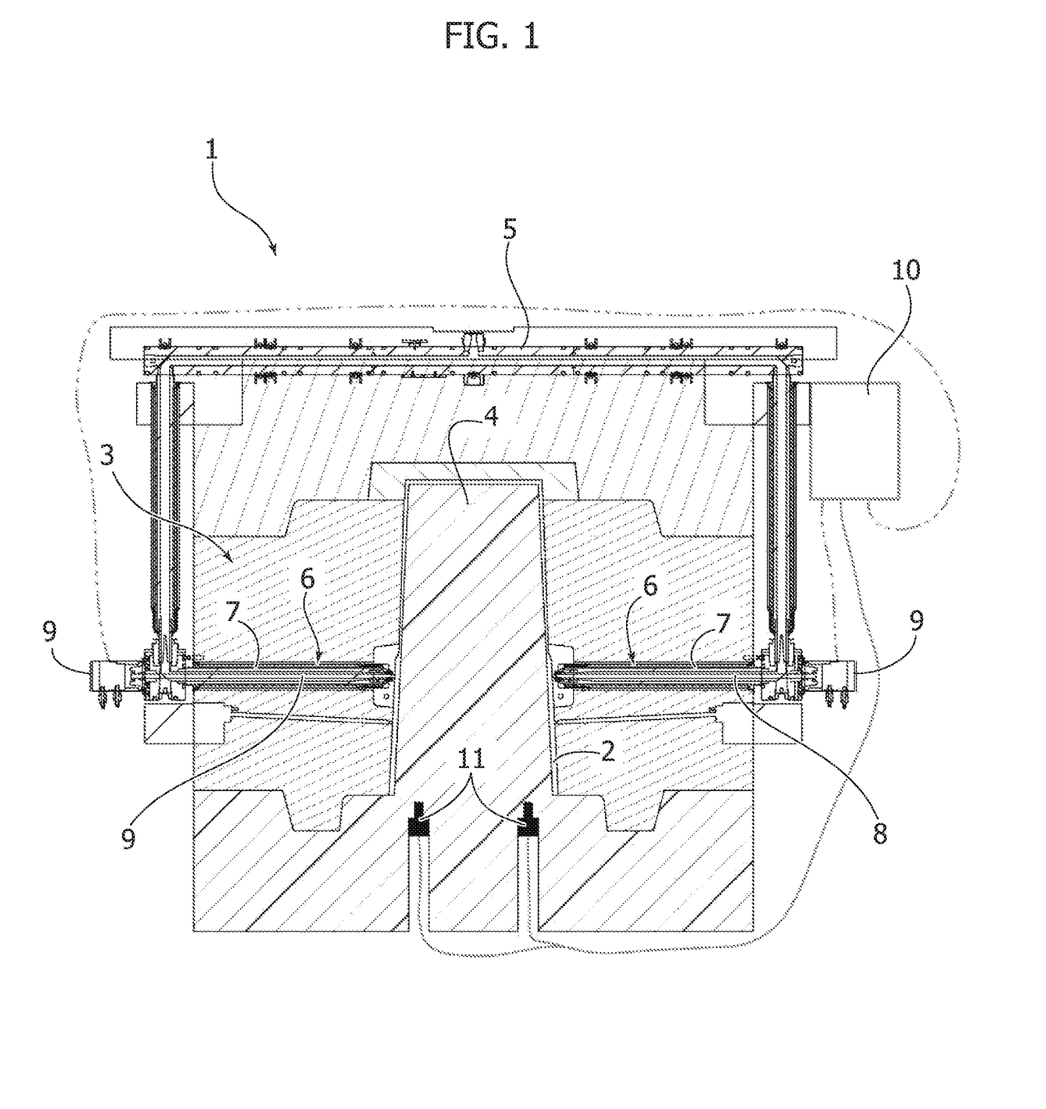
FIG. 1 is a sectional and partial schematic view of an injection moulding apparatus according to an embodiment of the invention.

The recipient C is produced using an apparatus schematically represented in FIG. 1, comprising a mould 1 having a cavity 2, a die 3, a core 4 couplable with the die (3) to delimit a space corresponding to the shape of the recipient C and a system for injecting the plastic material into such space.

The injection system typically comprises a hot runner or hot chamber 5 supplied by a press and connected, in the case of the illustrated example, to a pair of injectors 6 arranged on opposite sides with respect to the cavity 2 of the mould 1. It should be observed that the number and arrangement of the injectors could be different from the one illustrated in the example.

Each injector 6 comprises—in a per se known manner—a nozzle 7 in which there is axially mobile a pin valve 8 displaceable between a position of full closure and a position of maximum opening for the injection of the pressurised plastic material into the space comprised between the die 3 and the core 4. The displacement of each pin valve 8 is controlled by a respective actuator 9, of the fluid or more conveniently of the electrical type, for example of the rotary type, controlled by means of an electronic control unit 10.

The control unit 10 is programmed so as to control each actuator 9, and thus each injector 6, so as to adjust the pressure and flow rate of the plastic material injected by it. The control may in particular provide for the adjustment of the position, speed, acceleration and stroke of the pin valve 8 during the filling step.

Figure 2:
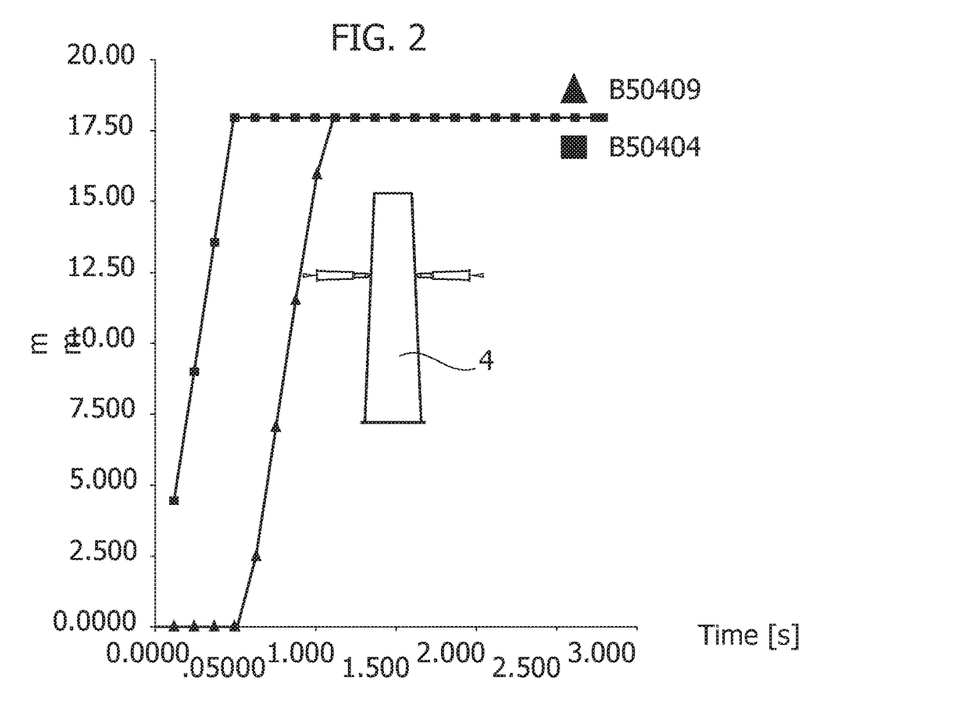
FIGS. 2, 3, 4, 5 and 6 are diagrams exemplifying injection methods and relative drawbacks according to the prior art.
Figure 3:
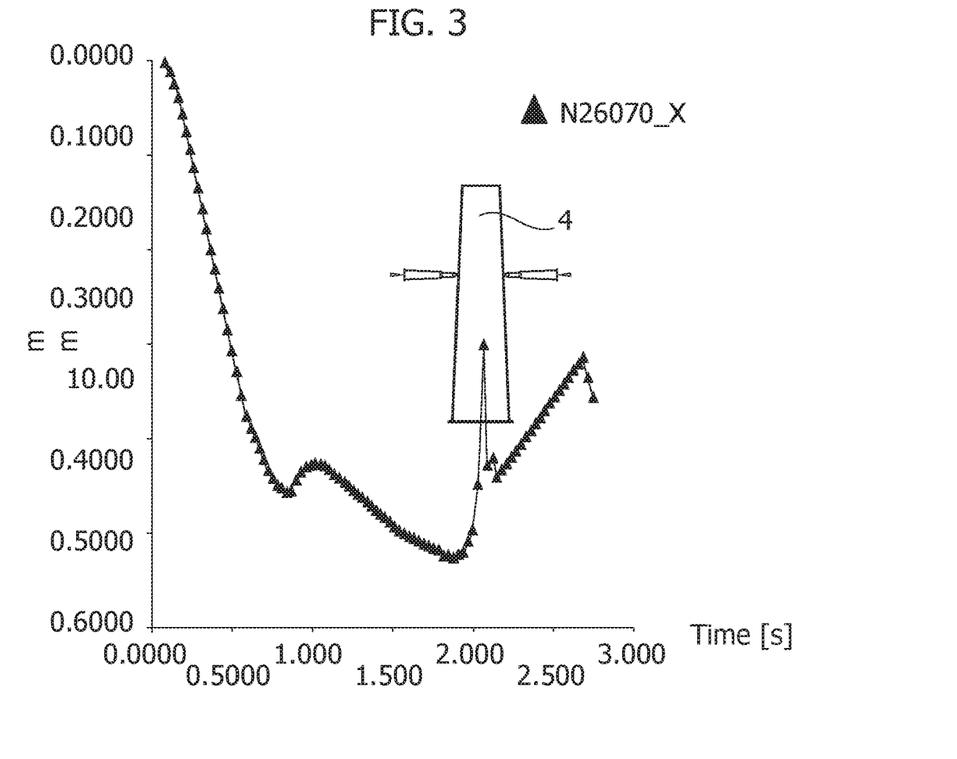
Figure 4:
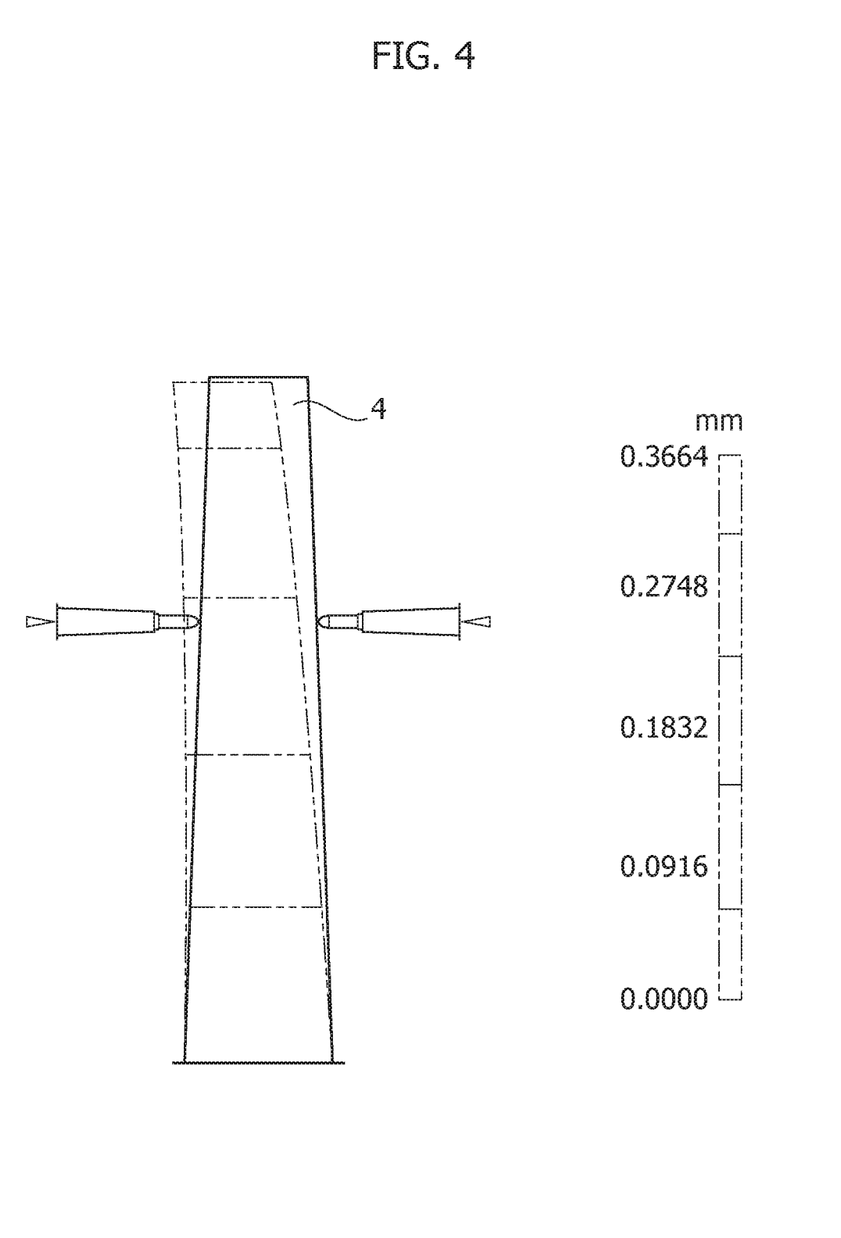
Figure 5:
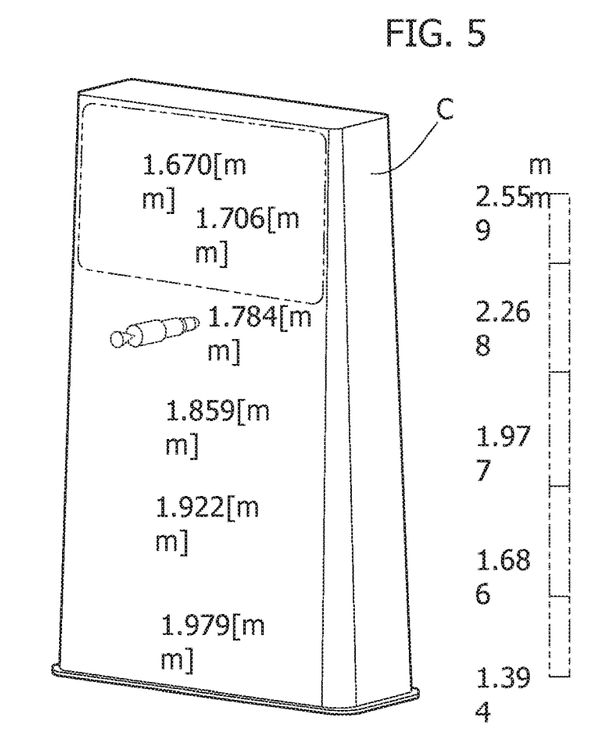
Figure 6:
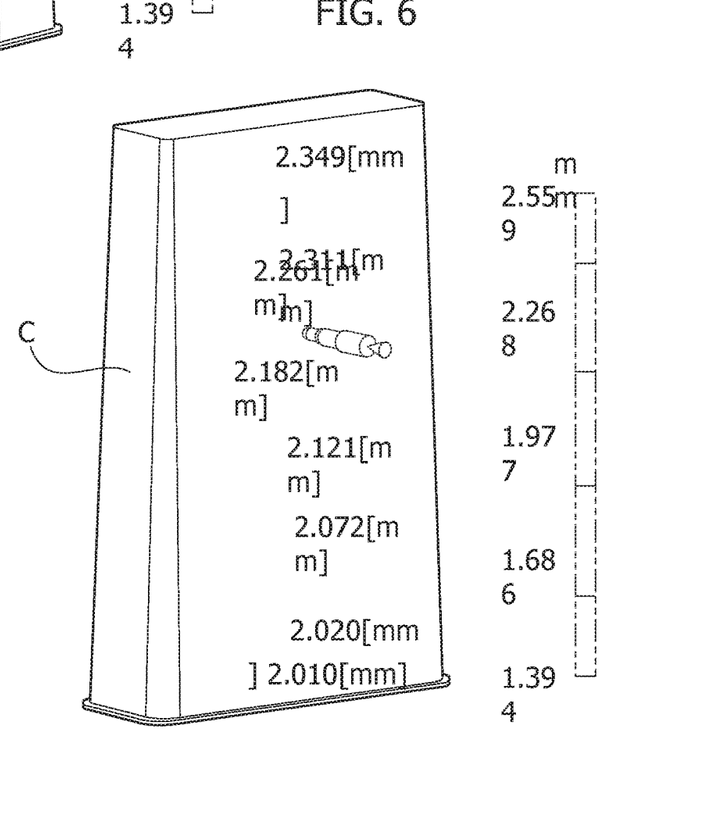
Figure 7:
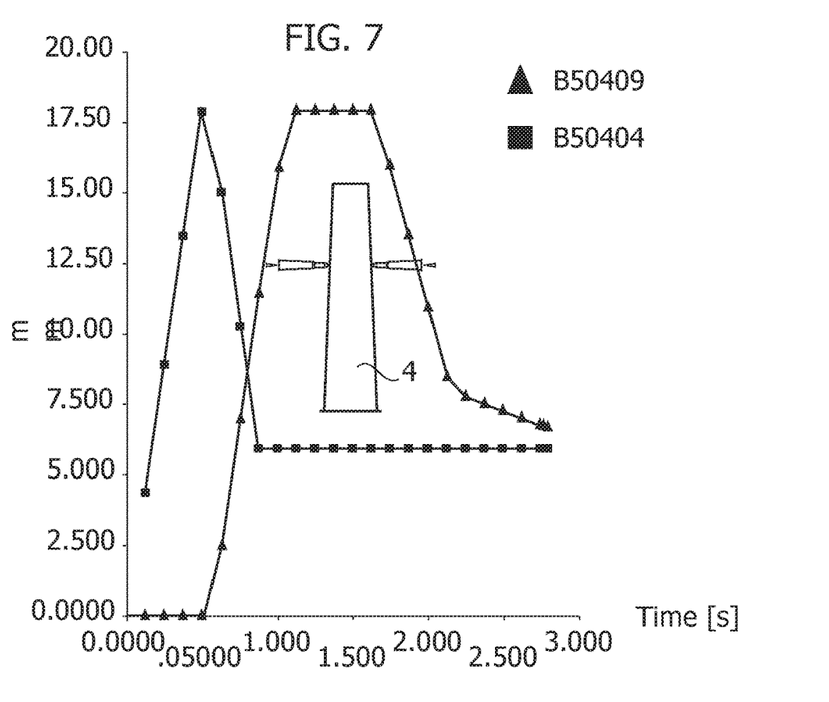
FIGS. 7, 8, 9, 10 and 11 are diagrams similar to those of FIG. 2-6 but regarding the invention.

FIGS. 2 and 3 are diagrams showing the injection methods provided for according to the prior art for moulding articles such as the recipient C. Such methods do not provide for the aforementioned control of the injectors by the electronic unit 10, hence the plastic material is injected in the same manner, in terms of flow rate and pressure, by both injectors. In particular, the diagram of FIG. 2 (in which it is fictitiously indicated that the two injectors open at different times whereas they actually open simultaneously) shows the position of the pin valves of both injectors during the opening step, as a function of the time, to which there corresponds a bending or a non-controlled flexural deflection of the core 4, which increases over time. At the end of the injection, the core 4 has the bent configuration—represented in fictitiously enlarged form in FIG. 4, with a displacement with respect to the non-deflected condition for example greater than 0.3 mm. Due to such deflection, the recipient C removed from the mould at the end of the injection has the structural defects exemplified in FIGS. 5 and 6: the larger part thereof corresponding to the flexural deflected inner face of the core 4 (FIG. 5) has a thickness progressively decreasing from the end edge thereof towards the bottom, while the other larger wall corresponding to the flexural deflected outer face side of the core 4 correspondingly has a thickness progressively increasing from the end edge thereof towards the bottom wall thereof. With a nominal wall thickness equivalent to 2 mm the less or excess pressure variation can thus also be well above 10%, and this can be unacceptable.

FIGS. 7-11 are diagrams corresponding to FIGS. 2 to 6 regarding the invention, i.e. with the help of the control of the displacement of the pin valve 8 of each injector 6 performed by the electronic unit 10. Such control, carried out independently for each actuator 9, regards the position, speed, acceleration and stroke of the respective pin valve 8 and it is based on signals coming from transducers suitable to detect the flexural deflection of the core 4 during injection.

Such transducers can be of various types and they can be arranged in different areas. As regards the type, there can be used one or more deflection transducers of the base of the core, such as those schematised with 11 in FIG. 1, or one or more position transducers of the free end of the core (for example induction sensors), possibly also combined with each other and even with one or more pressure transducers of the injected plastic material. As regards their position, besides what has been already been indicated, the transducers can be arranged on the core 4, on the die 3 and in the space comprised between the die 3 and the core 4.

The control thus carried out by the electronic unit is such that the possibly detected bending of the core 4 is corrected and eliminated, thus returning the core 4 to the non-deflected condition thereof, by acting on the flow rate and pressure of the plastic material supplied by one and/or the other injector 6.

Figure 8:
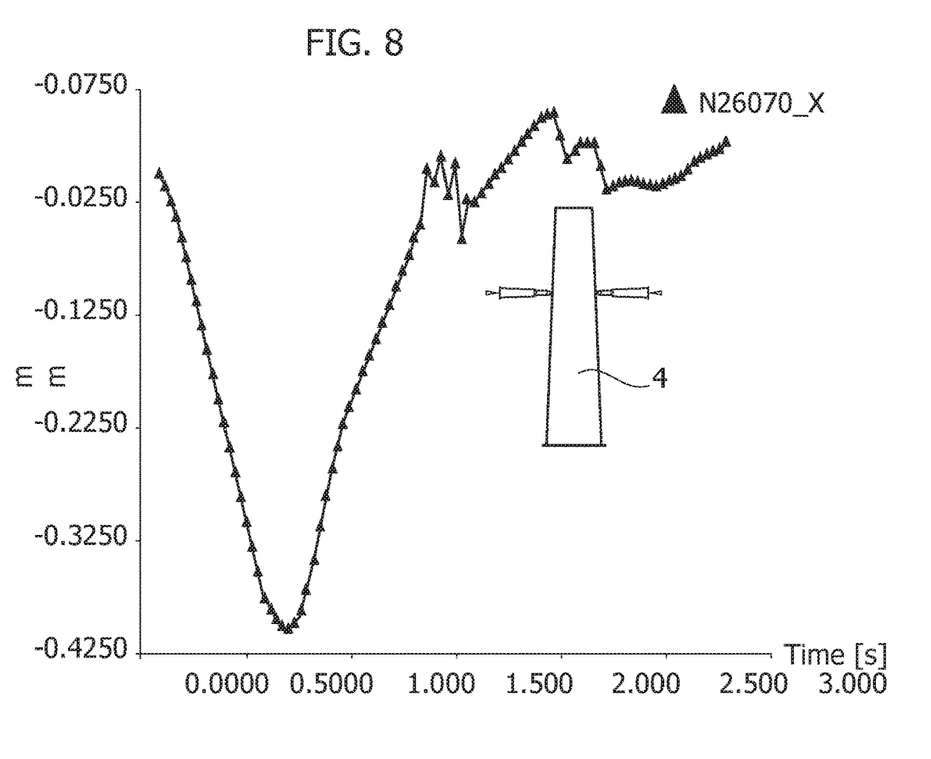
Figure 9:
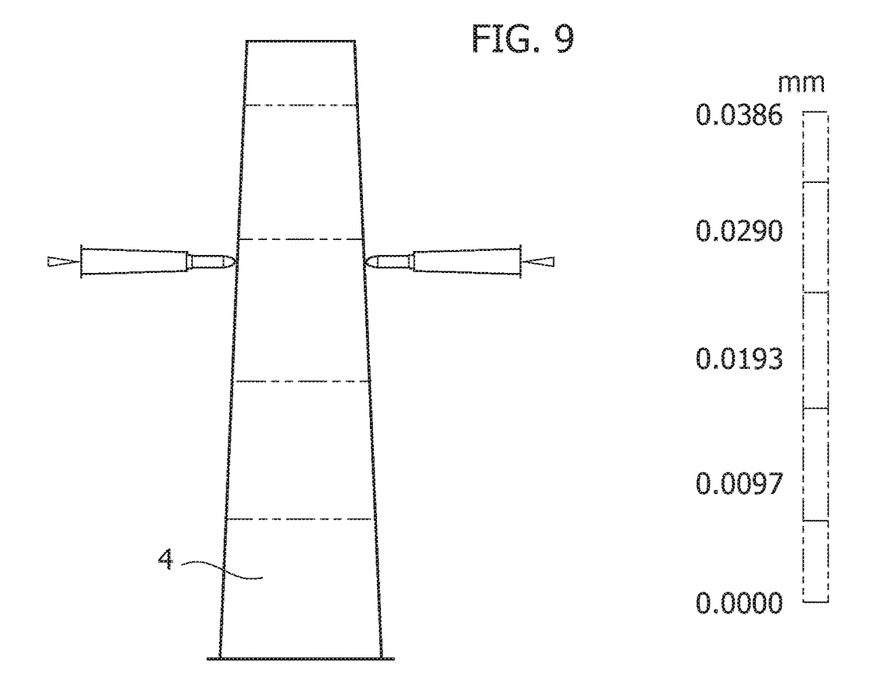
Figure 10:
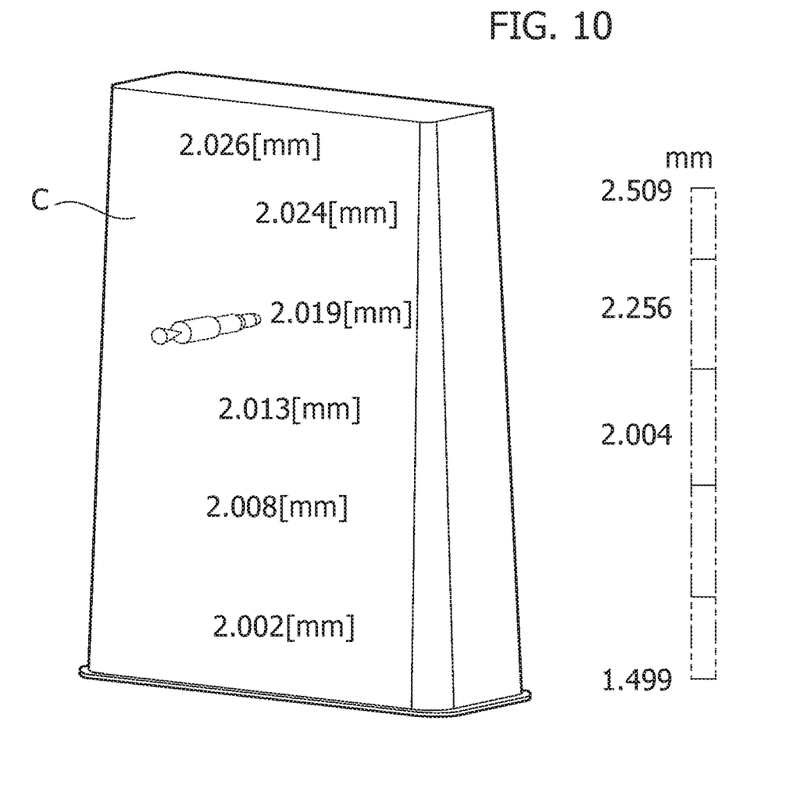
Figure 11:
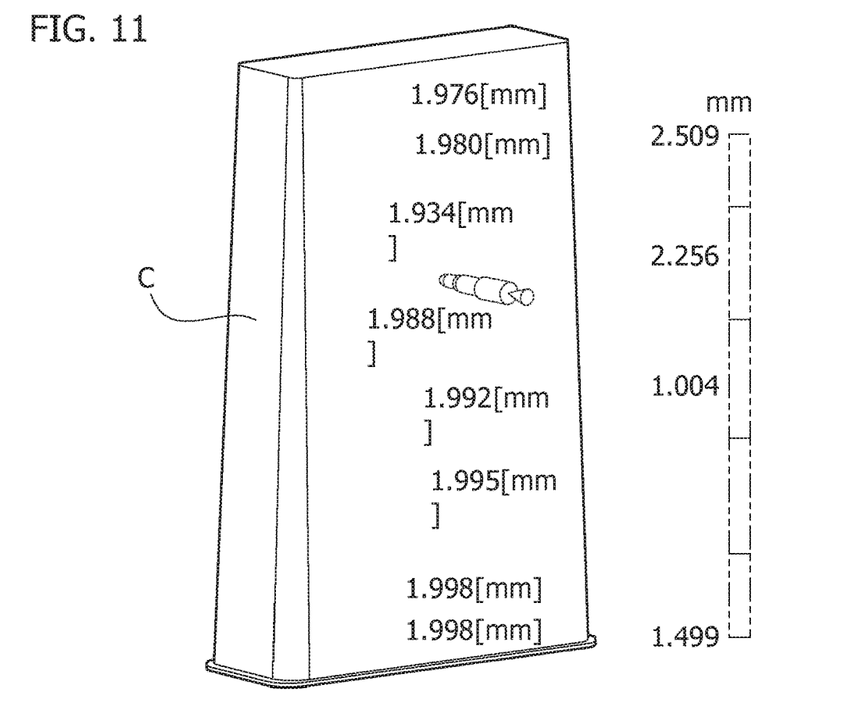

The diagram of FIG. 8 shows a correction example: upon reaching a maximum value, the detected deflection of the core 4 is countered and eliminated towards the final step of the injection, so as to return the core 4 to the initial non-deflected condition represented in FIG. 9. Thus, the thickness of the larger walls of the recipient C, as indicated in FIGS. 10 and 11, is almost constant and substantially corresponding to the design nominal value (2 mm).

Obviously, the construction details and the embodiments of the apparatus for implementing the method according to the invention may widely vary with respect to what has been described and illustrated, without departing from the scope of protection of the invention as described in the claims that follow. Thus, for example, as previously clarified, the number and position of the injectors will depend on the shapes and dimensions of the articles to be moulded. In case of articles of small dimensions, the injector may even be just one.

Furthermore, though the description explicitly refers to an entirely automatic control process, the scope of protection of the invention also covers a semi-automatic or manual methods, in which for example there is carried out a first injection detecting any deflection, modifying the parameters of the or of each injector if necessary and then injection is carried out a second time, any deflection is detected once again and the subsequent adjustment of the injection parameters are carried out if necessary, up to eliminating it.

The invention claimed is:

1. A method for producing hollow articles made of injection moulded plastic material by a mould having a die defining a cavity within which a core is inserted, and at least one pair of injectors, each injector including a pin valve displaceable between a closing position and an opening position for injecting the pressurized plastic material into a space comprised between the die and the core, comprising:
   actuating displacement of the pin valve of the or of each of the pair of injectors in a controlled fashion so as to adjust a pressure and a flow rate of the injected plastic material,
   detecting, during injection, any flexural deflection of the core, and
   upon detecting flexural deflection of the core, reducing or eliminating such flexural deflection of the core by adjusting at least one among a position, speed, acceleration and stroke of the pin valves so as to adjust the pressure and/or the flow rate of the injected plastic material, wherein in order to detect the flexural deflection of the core, a position of a free end thereof is measured, wherein the injecting of the pressurized plastic material is carried out by the at least one pair of injectors facing the core at opposite sides thereof, and wherein the pin valves facing the core at opposite sides thereof are separately controlled and utilized to correct the detected flexural deflection of the core by adjusting, based on the detected flexural deflection, at least one among the position, speed, acceleration and stroke of each pin valve so as to adjust the pressure and/or the flow rate of the injected plastic material.

2. The method according to claim 1, wherein in order to detect the flexural deflection of the core, one among a deflection of a base of the core and a pressure of the injected plastic material, or combinations thereof, is also measured.

3. The method according to claim 2, wherein injection is carried out by at least one pair of injectors located at opposite sides with respect to the core.

\* \* \* \* \*